US012694537B1

(12) United States Patent
Yu

(10) Patent No.: US 12,694,537 B1
(45) Date of Patent: Jul. 28, 2026

(54) AUGMENTING FOREGROUND OF A CONFERENCE PARTICIPANT

(71) Applicant: Zoom Video Communications, Inc., San Jose, CA (US)

(72) Inventor: Chi-chian Yu, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 469 days.

(21) Appl. No.: 18/315,930

(22) Filed: May 11, 2023

Related U.S. Application Data

(63) Continuation of application No. 17/588,474, filed on Jan. 31, 2022, now abandoned.

(51) Int. Cl.
| *G06T 7/194* | (2017.01) |
| *G06T 11/20* | (2026.01) |
| *G06V 40/20* | (2022.01) |

(52) U.S. Cl.
CPC .............. *G06T 7/194* (2017.01); *G06T 11/20* (2013.01); *G06V 40/20* (2022.01); *G06T 2210/12* (2013.01)

(58) Field of Classification Search
CPC ..... G06T 7/194; G06T 11/20; G06T 2210/12; G06V 40/20
See application file for complete search history.

(56) References Cited

U.S. PATENT DOCUMENTS

| 8,767,034 | B2 | 7/2014 | Setton |
| 9,503,685 | B2 | 11/2016 | Baron, Jr. et al. |

| 2013/0342636 | A1* | 12/2013 | Tian ......................... G06T 7/269 |
| | | | 348/14.08 |
| 2015/0220777 | A1* | 8/2015 | Kauffmann .......... H04N 23/958 |
| | | | 382/103 |
| 2017/0140543 | A1* | 5/2017 | Eliraz-Levonai ......... G06T 7/12 |
| 2019/0012794 | A1* | 1/2019 | Radwin ..................... G06T 7/11 |
| 2020/0211201 | A1* | 7/2020 | Chiang ................. G06T 11/001 |
| 2021/0279888 | A1* | 9/2021 | Luo ........................... G06T 7/11 |
| 2022/0157342 | A1* | 5/2022 | Kliushkin ............ G11B 27/036 |
| 2022/0301180 | A1* | 9/2022 | Wang .................... G06T 3/4038 |
| 2022/0350925 | A1* | 11/2022 | Alexander ............ H04W 12/02 |

OTHER PUBLICATIONS

Virtual Background Changer: What it is and how it works, Alexei Kovalev, https://www.banuba.com/blog/virtual-background-changer-what-it-is-and-how-it-works, May 3, 2020, 17 pages.

(Continued)

*Primary Examiner* — Matthew C Bella
*Assistant Examiner* — Andrew B. Jones
(74) *Attorney, Agent, or Firm* — Young Basile Hanlon & MacFarlane. P.C.

(57) ABSTRACT

A foreground portion and a background portion are obtained from an image of a conference participant. Using a background replacement image, a replacement background portion corresponding to the background portion is obtained. An indication of an image portion that is included in the image and is outside the foreground portion is obtained. An output image that includes the replacement background portion, the foreground portion, and the image portion is generated such that the foreground portion and the image portion are visible in the output image. The output image is transmitted.

20 Claims, 13 Drawing Sheets

(56) References Cited

OTHER PUBLICATIONS

Virtual Background for Video Conferencing Using Machine Learning, Shaashwat Agrawal, https://towardsdatascience.com/virtual-background-for-video-conferencing-using-machine-learning-dfba17d90aa9, Nov. 11, 2020, 16 pages.

GitHub, Real-time portrait segmentation for mobile devices, https://github.com/anilsathyan7/Portrait-Segmentation, Jan. 17, 2021, 67 pages.

* cited by examiner

500

FOREGROUND AUGMENTATION
SOFTWARE

BACKGROUND IMAGE
REPLACEMENT TOOL

502

IMAGE SEGMENTATION TOOL

504

OUTPUT IMAGE TOOL

506

GESTURE RECOGNITION TOOL

508

OBJECT DETECTION TOOL

510

ASR TOOL

512

PRE-PROCESSING TOOL

514

THIRD-PARTY INTEGRATION TOOL

516

OCR TOOL

518

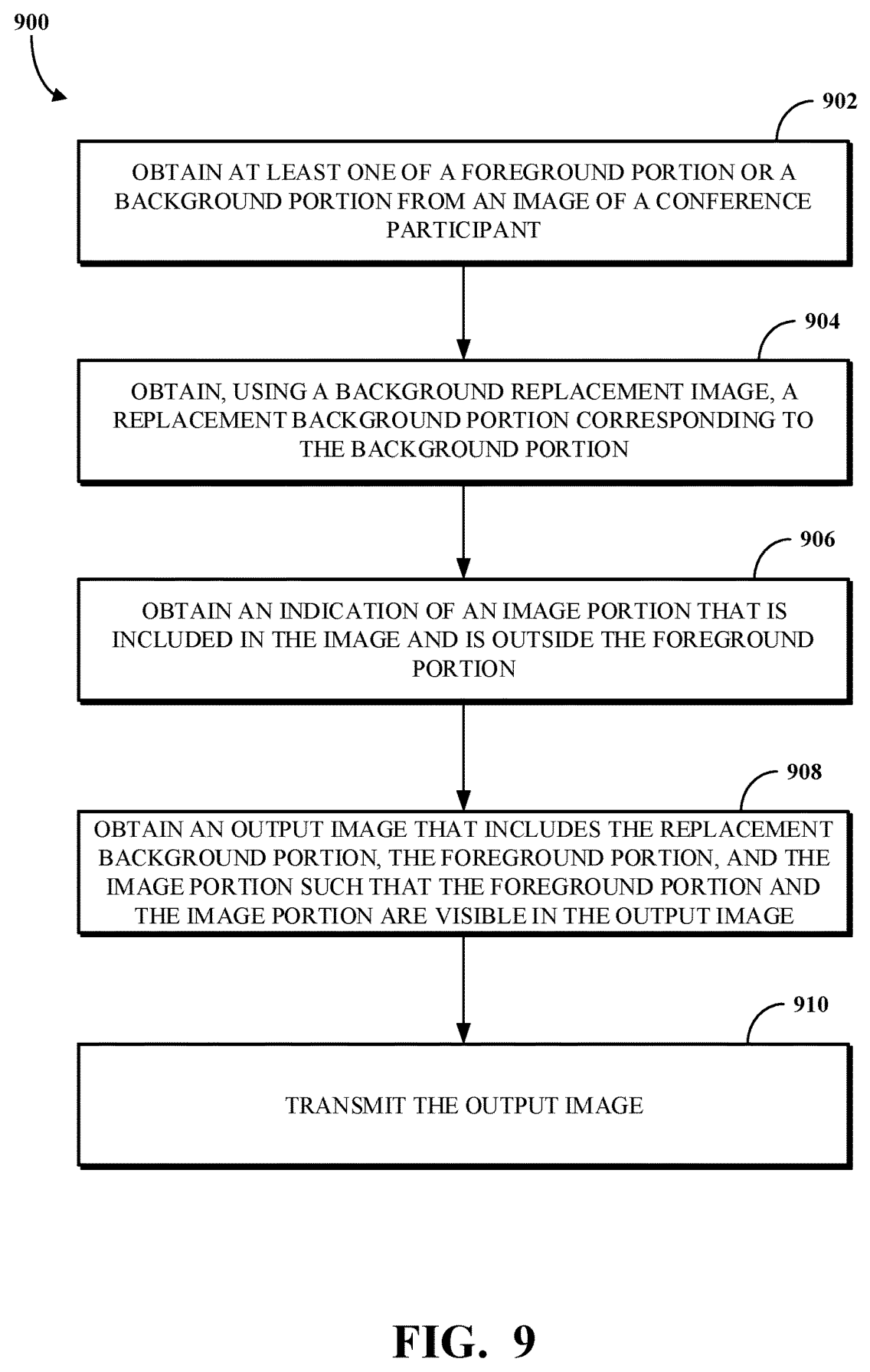

900

902

OBTAIN AT LEAST ONE OF A FOREGROUND PORTION OR A
BACKGROUND PORTION FROM AN IMAGE OF A CONFERENCE
PARTICIPANT

904

OBTAIN, USING A BACKGROUND REPLACEMENT IMAGE, A
REPLACEMENT BACKGROUND PORTION CORRESPONDING TO
THE BACKGROUND PORTION

906

OBTAIN AN INDICATION OF AN IMAGE PORTION THAT IS
INCLUDED IN THE IMAGE AND IS OUTSIDE THE FOREGROUND
PORTION

908

OBTAIN AN OUTPUT IMAGE THAT INCLUDES THE REPLACEMENT
BACKGROUND PORTION, THE FOREGROUND PORTION, AND THE
IMAGE PORTION SUCH THAT THE FOREGROUND PORTION AND
THE IMAGE PORTION ARE VISIBLE IN THE OUTPUT IMAGE

910

TRANSMIT THE OUTPUT IMAGE

FIG. 9

AUGMENTING FOREGROUND OF A CONFERENCE PARTICIPANT

CROSS REFERENCE TO OTHER APPLICATIONS

This application is a continuation of U.S. patent application Ser. No. 17/588,474, filed Jan. 31, 2022, the entire disclosure of which is incorporated herein by reference.

FIELD

This disclosure relates generally to communication management and, more specifically, to augmenting a foreground portion of an image of a conference participant with an additional image portion.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a flowchart of an example of a technique for augmenting a foreground portion of images of a conference participant.

DETAILED DESCRIPTION

Figure 1:
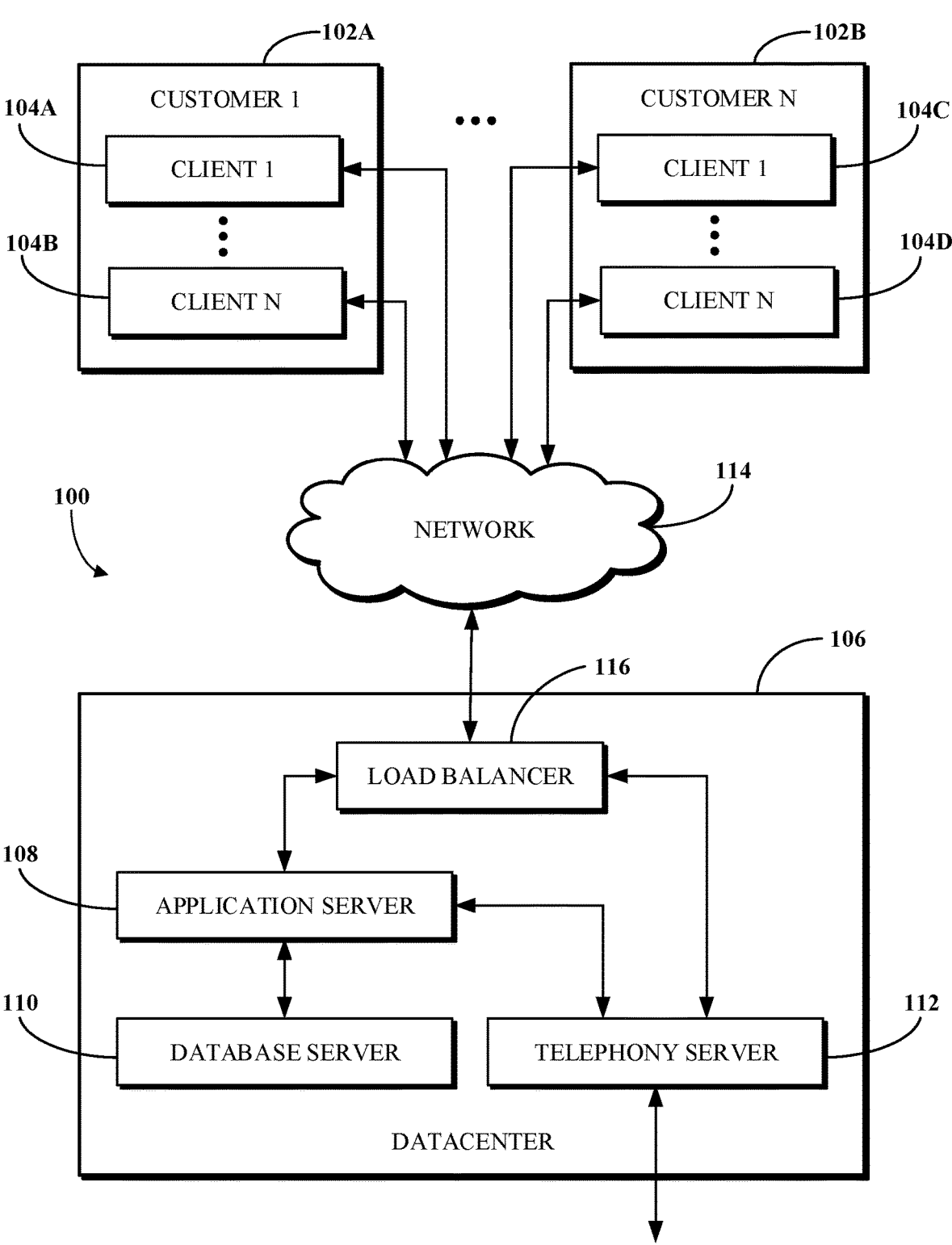
FIG. 1 is a block diagram of an example of an electronic computing and communications system.

Conventional conferencing software may allow conference participants to participate in audio-visual conferences. To visually participate in a conference, a user may turn on his/her camera. The conferencing software may obtain a video feed of the participant for transmission to other participants of the conference. The participant whose video feed is obtained is referred to herein as a "user" or "participant," and the participants to whom images that show the user are transmitted are referred to herein as the "other participants."

The user may provide an indication of a background replacement image (BGRI) that is to be used in place of the actual background of the user. A BGRI is an image or otherwise image data used to mask (e.g., overlay, overwrite, replace) a portion (e.g., referred to herein as a background portion) of an image of the user. The BGRI may be used for several reasons including, for example, to maintain privacy of the user, to add levity to the conference, or to present a professional image of the user. In an example, the BGRI may be a blurred version of the user's actual background. In another example, the BGRI may be a virtual image (which may also be referred to as a virtual background). A virtual background may be selected by the user within a client-side conferencing software (e.g., a conferencing software that is included in an application executable on a user device) or may be pre-selected for the user (such as by an employer of the user).

The conferencing software or a component (e.g., tool, software, application) associated therewith may process images (e.g., video frames) of an image stream (e.g., a video feed) to replace the actual background captured by the camera with a corresponding (e.g., co-located and co-extensive) portion from the BGRI. An image of the image stream, which is captured by the camera of the user, is referred to herein as a "camera image;" and the image of the user that is transmitted for display to the other participants is referred to herein as an "output image."

A camera image may be segmented (e.g., separated, partitioned, split, or otherwise divided) into a foreground portion and a background portion. The foreground portion is the portion of the camera image that includes (e.g., shows, is determined to include) the user. The background portion is the portion of the camera image that includes the rest of the camera image that is not part of the foreground portion. To illustrate, if the user is sitting in front of the camera, the foreground portion may include the portion of the user within a field of view of the camera (e.g., his or her head and torso) and potentially one or more objects (e.g., a desk, a keyboard, and/or a mouse) that may be within the field of view of the camera; and the background portion may include everything else in the camera image. It is noted that the foreground portion or the background portion may include disjointed (e.g., disconnected or otherwise non-continuous) portions of a camera image. In some configurations, the one or more objects may be considered part of the background portion rather than part of the foreground portion.

To reiterate, the conferencing software or the associated component may replace the background portion with a corresponding (e.g., co-located and co-extensive) portion from the BGRI. The corresponding portion from the BGRI is referred to herein as the "replacement background portion" (RBGP). In an example, the conferencing software may be server-based (e.g., executed on a server). In another example, the component associated with the conferencing software may be software that executes at the edge (e.g., at a user device of the user). For example, the component associated with the conferencing software may be an application that is installed on the user device and communicates with a server-based conferring application therewith enabling the user to participate in conferences. In an example, the component associated with the conferencing software may execute in the camera of the user device. The camera may include executable instructions for receiving a BRGI. The camera (e.g., instructions therein) can post-process camera images captured by the camera to replace the actual background with the RBGP obtained from the BRGI. Thus, the camera image may be processed by the camera and the image obtained from the camera may be the output image.

The foreground portion may be overlaid on the BGRI to obtain an output image. Equivalently, or similarly, the foreground portion may be combined with the RBGP to obtain the output image or the RBGP may be overlaid on the foreground portion. The output image may be transmitted for display on respective display devices of the other participants.

Because the BGRI is intended to operate to prevent anything from the original video feed other than the foreground portion (e.g., the portion of the camera image that is determined to include the user) from being shown to the other participants, objects accessible to the user are generally deemed to be in the background portion and accordingly blurred or entirely filtered out by the BGRI (or, more accurately, by the RBGP). Such objects are said to not be seen (i.e., not clearly viewable or unclear) in the output image. To be clear, as used herein, blurred objects are not considered visible in the output image because they are not as clearly discernible in the output image as in the original camera image. Similarly, objects that may be partially visible (such as due to segmentation anomalies) are likewise not considered visible in the output image.

In some situations, the user may wish to include in (e.g., add to) the foreground portion objects that would otherwise be replaced (e.g., overlayed, blurred, hidden, or otherwise unseen) by the RBGP. Such objects may be elsewhere in the image frame (i.e., within the field of view of the camera) or may be held, touched, pointed to, or the like by the user. To do so using conventional conferencing software, the user may have to place the object in front of him or her so that the object is reliably and wholly included in the foreground portion of the camera image. This may be because the segmentation technique used by such conferencing software may not detect and include the whole of the object in the foreground portion. In many cases, having to place the object in front of the user can be awkward when trying to show the object to the other participants due to the strangeness of the angle and the likelihood that the object will need to remain close to the user. In other cases, it may not be possible due to the size, weight, and/or location of the object. As such, conventional conferencing software do not reliably enable a user to show the other conference participants an object that is outside (e.g., not included in) the foreground portion.

Implementations of this disclosure address problems such as these by obtaining an indication of a portion of the camera image of the user (referred to as an "image portion") that the user intends to show to the other participants, such as within a video stream to be processed as part of a video conference implemented using conferencing software. As the camera image is a picture of the user's physical environment, obtaining an indication of the portion of the camera image includes obtaining an indication of an object that is in the physical environment of the user or an indication of a part of the physical environment of the user. Similarly, as the camera image includes objects that are in a field of view of a camera that obtained (e.g., captured) the camera image, obtaining an indication of the portion of the image includes obtaining an indication of an object that is in the field-of-view of the camera. The image portion is part of the background portion of the image.

The image portion is typically part of the background portion of the image. However, the image portion may be spread across the foreground portion and the background portion (e.g., the client device or camera may recognize parts of the image portion as being in the background portion and parts of the image portion as being in the foreground portion, depending on the size, color, proximate location and other characteristics of the object located in the image portion). To illustrate, a segmentation software may include only a portion of an object in the foreground segment and the rest of the object in the background segment. Objects (or more generally, image portions) that are not wholly included in the foreground segment are considered to be part of the background segment. However, the user intends that the whole of the image portion is to be shown to the other participants (and thus the user intends that the whole of the image portion is not to be covered or blurred by the BGRI and instead be part of the output image).

According to this disclosure, a software platform that provides conferencing capabilities can identify the image portion based on the indication of the image portion received from the user and augment the foreground portion with the image portion. Augmenting the foreground portion with the image portion can mean that the image portion is included in the output image. In some examples, including the image portion in the output image can mean or include substituting the corresponding portion of the RBGP with the image portion.

To describe some implementations in greater detail, reference is first made to examples of hardware and software structures used to implement augmenting a foreground portion of a conference participant with an additional image portion. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information tion sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
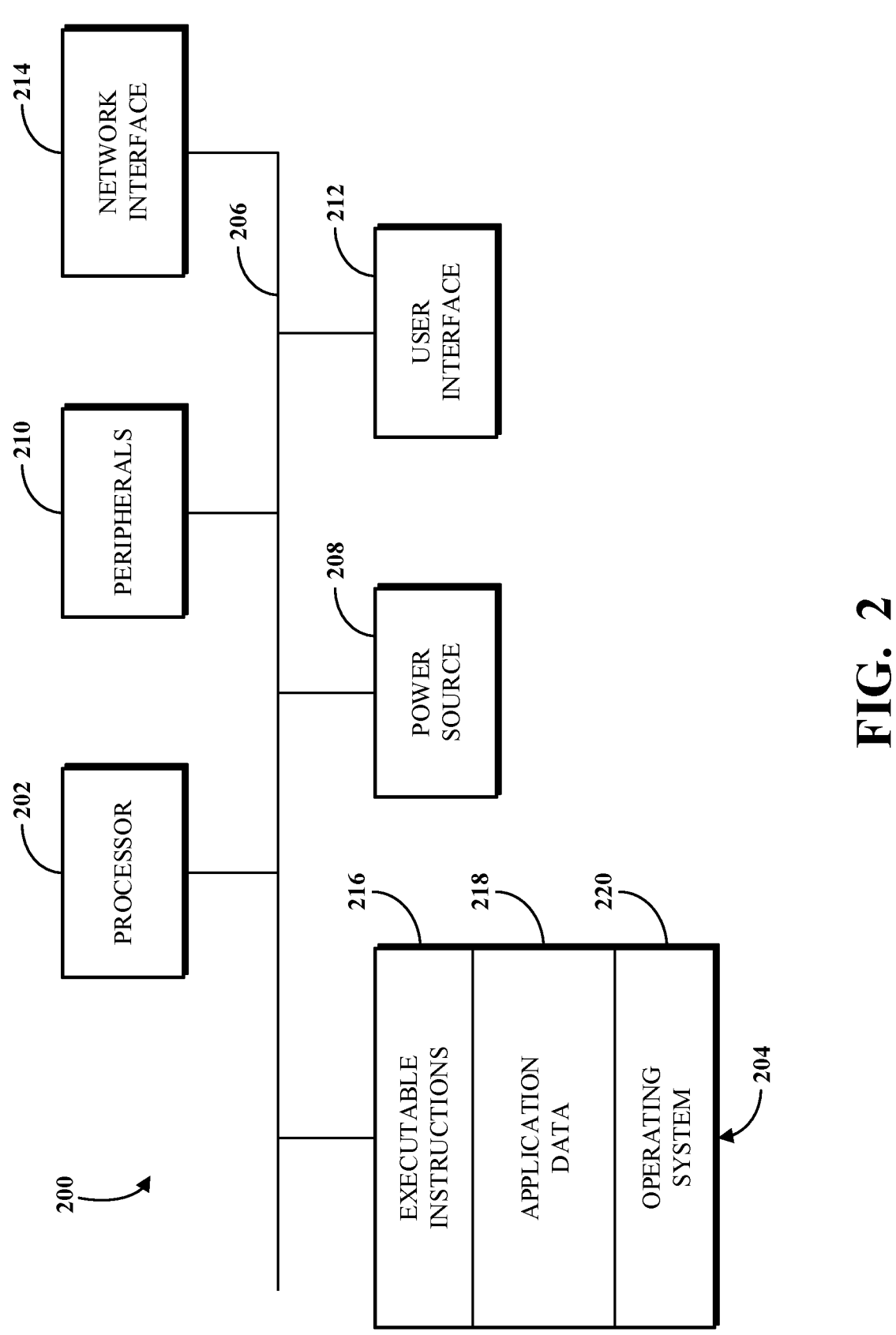
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
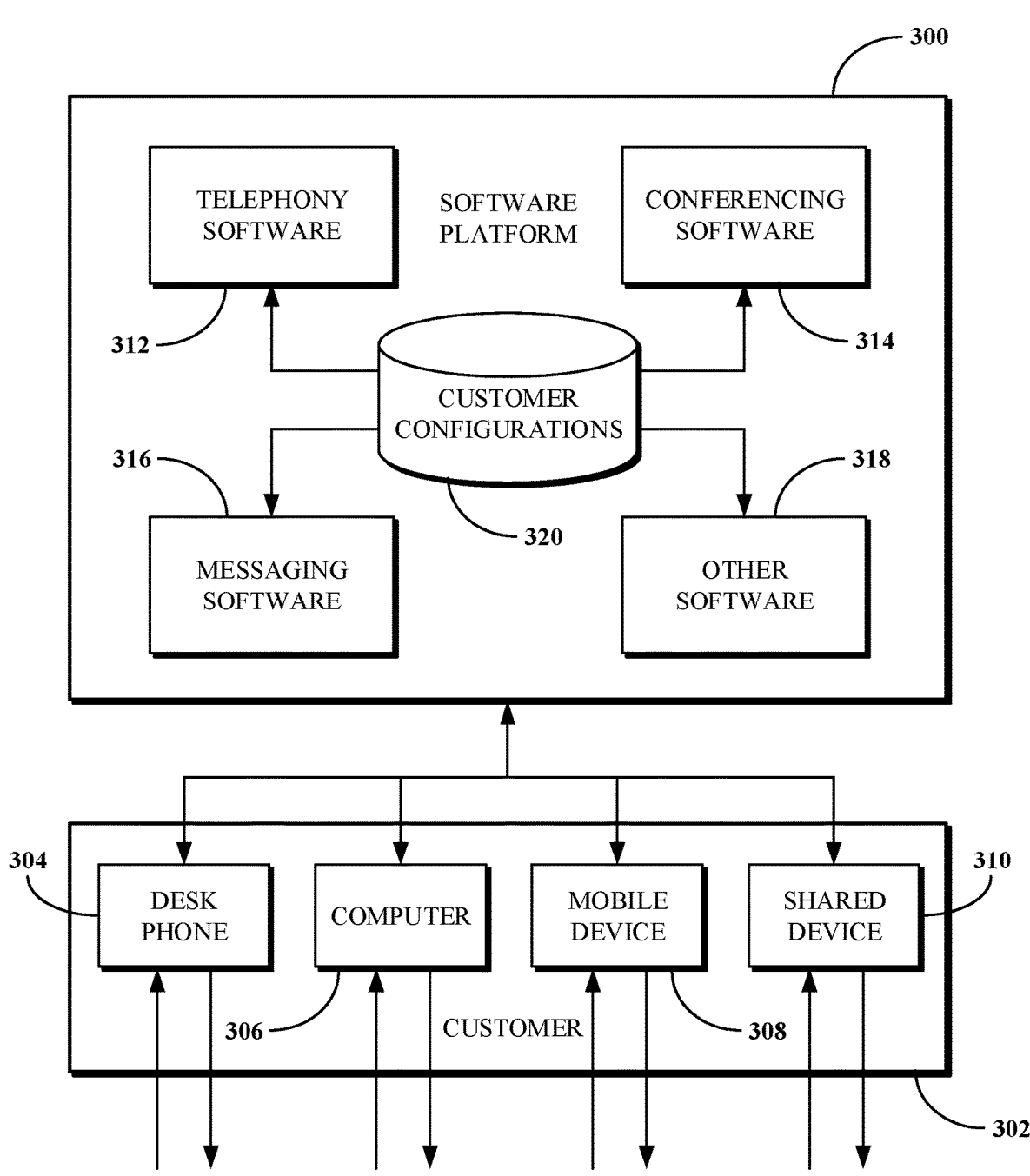
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for augmenting a foreground image portion of a conference participant with an additional image portion.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4A:
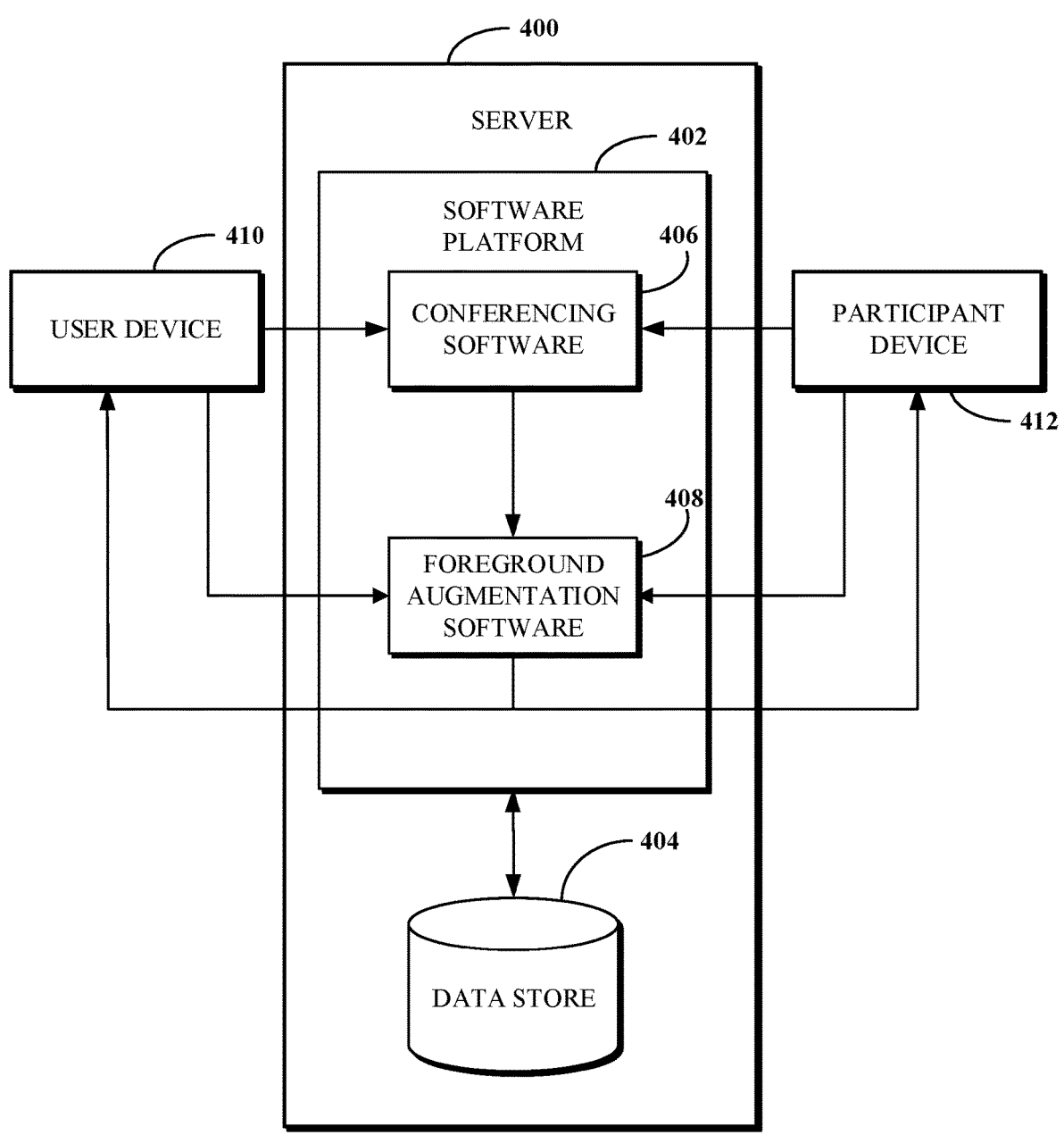
FIGS. 4A-B are block diagrams of examples of a system for augmenting a foreground portion of a conference participant with an additional image portion.
Figure 4B:
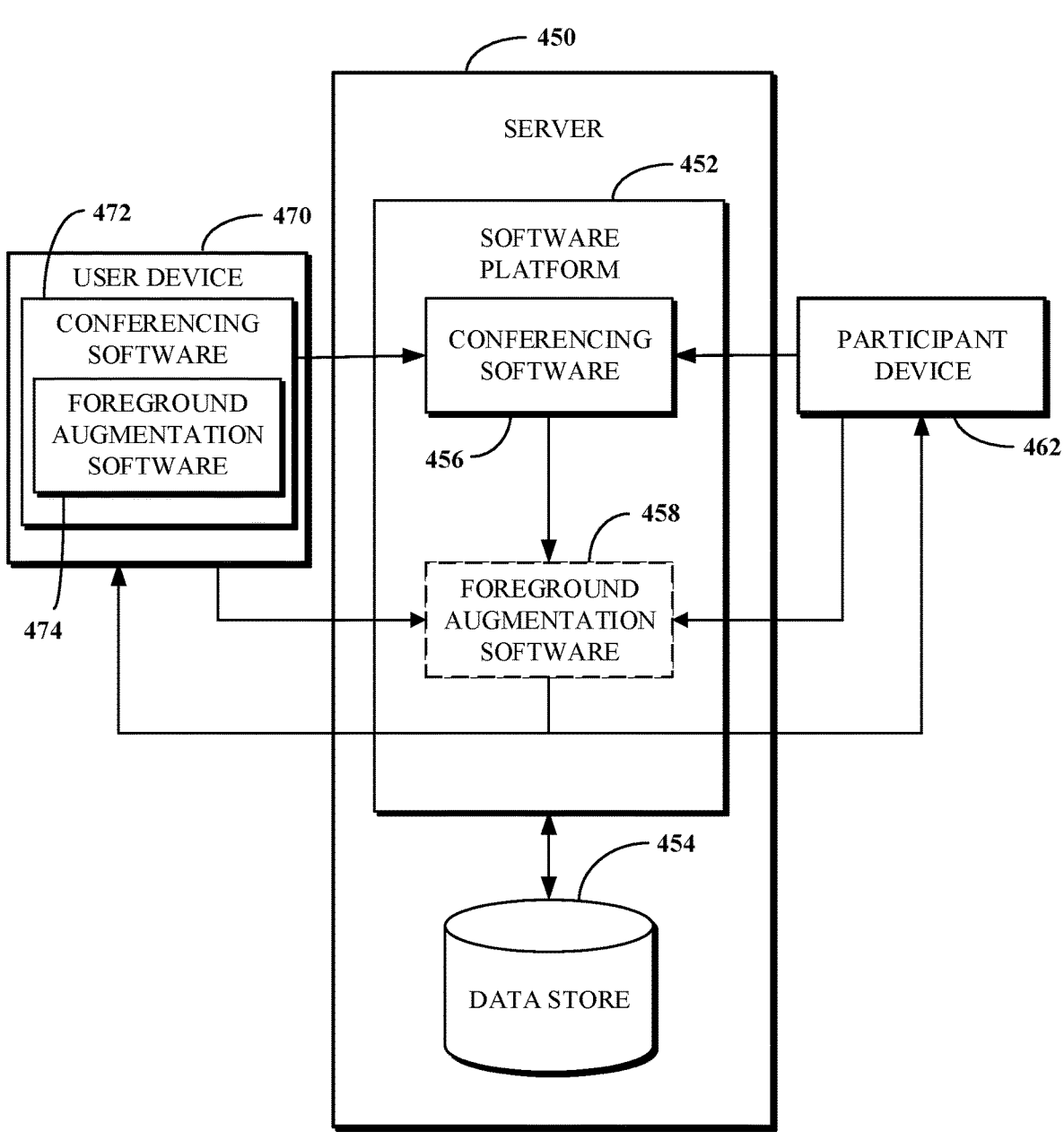

FIGS. 4A-B are block diagrams of examples of a system for augmenting a foreground portion of a conference participant with an additional image portion. Referring first to FIG. 4A, and as described above, the conference participant (i.e., a user) may have his or her camera enabled during a conference. The server 400 may obtain camera images (i.e., images captured by the camera of the user) and transmit those camera images (if the user has not selected a BGRI) or output images (if the user has selected a BGRI) obtained therefrom to the other conference participants.

The user may set a BGRI, which the server 400 uses to replace the actual background of the user. The server 400 may obtain segmentations of camera images into respective foreground portions and background portions. A foreground portion is the set of pixels of the camera image that are determined (e.g., calculated, inferred, or classified) to be foreground pixels. A background portion can be the set of all pixels that are not included in a foreground portion. As also mentioned, the pixels of the foreground portion may not be a connected set of pixels that can be enclosed in a single convex envelop that does not contain non-foreground pixels.

As shown, the server 400 implements or includes a software platform 402 and a data store 404. The server 400 can be one or more servers implemented by or included in a datacenter, such as the datacenter 106 of FIG. 1. The software platform 402 provides conferencing services (e.g., capabilities or functionality) via conferencing software 406. The software platform 402 can be or can be part of the software platform 300 of FIG. 3. The conferencing software 406 can be variously implemented in connection with the software platform 402. In some implementations, the conferencing software 406 can be included in or can work in conjunction with one or more of the telephony software 312, the messaging software 316, or the other software 318 of FIG. 3. For example, the conferencing software 406 may be or may be integrated within the telephony software 312. In another example, the conferencing software 406 may be or may be integrated within the conferencing software 314.

The data store 404 can store data related to users (e.g., conference participants) and conferences. The data store 404 can be included in or implemented by a database server, such as the database server 110 of FIG. 1. The data store 404 can include data related to scheduled or ongoing conferences and data related to users of the software platform 402. For example, the data store 404 can include associations between users and BGRIs. As an example, the data store 404 may store, with respect to a user, a preference indicating a particular BGRI that is to be used for the user in all conferences that the user participates in. For example, the data store 404 may store an indication of a BGRI selected by a user for use during a particular conference. As an example, the data store 404 may store an indication of a BGRI that is to be used for, and cannot be changed by, members of a particular group of users. The data store 404 can store other associations between users and BGRIs.

A user device 410 can be a device of a user who is configured (e.g., enabled) to or otherwise can join a conference. The user device 410 may, for example, be one of the clients 304 through 310 of FIG. 3. Alternatively, the user device 410 may be a device other than a client device. The user device 410 may include an application (not shown) that may be or include a conferencing software. The user device 410 can include a camera (not shown) that can be configured to capture images of the user while the user is in a conference. At least some of the camera images (or output images obtained therefrom) may be transmitted by the user device 410 to the server 400.

The server 400 can use the camera images to obtain output images of the user. The output images are transmitted to the participant device 412 of another conference participant. A conferencing software (not shown) of the participant device 412 can cause the output images to be displayed on a display of the participant device 412. Although FIG. 4A illustrates one participant device 412, as can be appreciated, participant devices of multiple respective users can simultaneously connect to a conference. Similarly, the conferencing software 406 can enable many conferences to be concurrently active.

In an example, the output images may be the same as the camera images. That is, the output images may include the same content as the camera images where the output images and the camera images have the same resolution, bit depth, quality, or other such characteristics. The software platform 402 of the server may receive an indication of a BGRI to be used for the user of the user device 410. In an example, the indication may be received from the user. For example, the user may select a background blurring option (e.g., light blurring, heavy blurring); the user may select a virtual image from an available catalogue of virtual images; or the user may provide an image file or an image filename that is to be used as the BGRI. In the output images, the software platform 402 replaces the actual background of the camera images with a corresponding RBGP, as further described herein.

The server 400 may receive, from the user and via the user device 410, an indication of an image portion of a camera image that would not be included in the output image because the image portion would be replaced by the RBGP. A foreground augmentation software 408 of the software platform 402 can include the image portion in the output images so that the foreground portion and the image portion (but not the rest of the background portion) are visible in the output images.

The foreground augmentation software 408 may form an output image by, logically, starting with the BGRI, overlaying a foreground portion on the BGRI, and overlaying the image portion on the BGRI. Any number of techniques can be used to combine image data. For example, overlaying first image data (e.g., the foreground portion, the image segment) on second image data (e.g., the BGRI) can mean pixel-by pixel replacement of the second image data with the first image data. Image masking techniques can also be used. As can be appreciated, the BGRI and the camera image may initially have different sizes. In such cases, the software platform 402 (e.g., software therein) can use image scaling (e.g., up-sampling, down-sampling) to normalize the sizes of the images or image portions used to obtain the output images.

Referring next to FIG. 4B, the system includes a server 450, a software platform 452, conferencing software 456, a data store 454, and a participant device of 412, which can be the same or similar to the server 400, the software platform 402, the conferencing software 406, the data store 404, and the participant device of 412 of FIG. 4A, respectively. In some implementations, the software platform 452 can include a foreground augmentation software 458, which can be or can be similar to the foreground augmentation software 408 of FIG. 4A.

The user device 470 includes a conferencing software 472, which in turn can include or work in conjunction with a foreground augmentation software 474. The user device 470 includes a camera (not shown). In some implementations, the user device 470 obtains camera images from the camera, processes the images to obtain output images, as described herein, and transmits the output images to the server 450, which in turn may transmit the output images to the participant device 462.

In some implementations, the user device 470 may communicate directly with the participant device 462, such as in the case of peer-to-peer real-time communications. As such, output images obtained at the user device 470 can be transmitted directly to the participant device 462. A real-time communication application of the participant device 462, which can include a conferencing software, can display the output images on the participant device 462.

Figure 5:
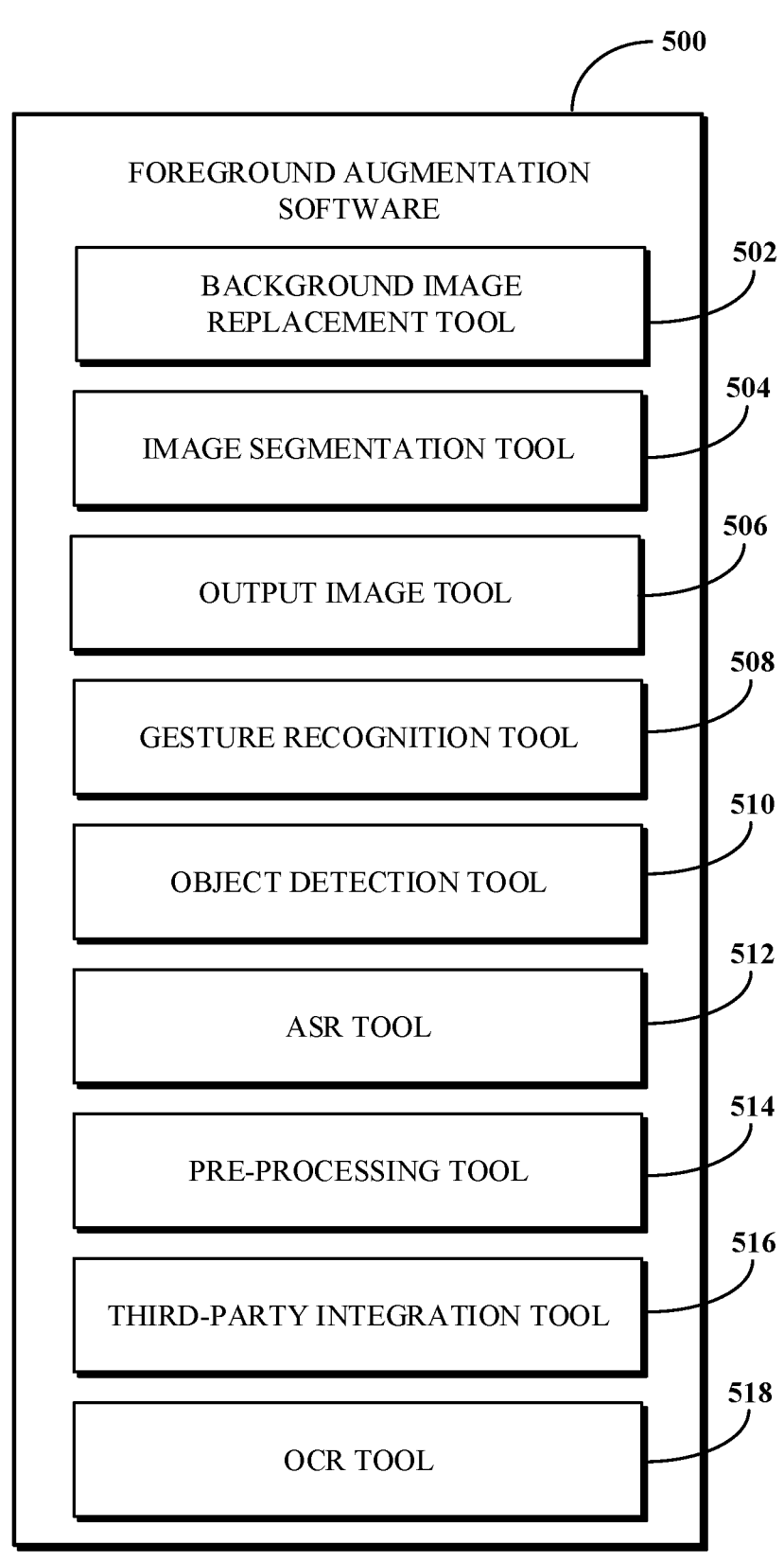
FIG. 5 is a block diagram of example functionality of foreground augmentation software.

FIG. 5 is a block diagram of example functionality of foreground augmentation software 500, which may be, for example, the foreground augmentation software 408 shown in FIG. 4A or the foreground augmentation software 474 of FIG. 4B, to the extent different. The foreground augmentation software 500 includes tools, such as programs, subprograms, functions, routines, subroutines, operations, executable instructions, and/or the like for, inter alia and as further described below, obtaining (e.g., generating) output images of a user. At least some of the tools can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the foreground augmentation software 500 includes a background image replacement tool 502, an image segmentation tool 504, an output image generation tool 506, a gesture recognition tool 508, an object recognition tool 510, an automated speech recognition (ASR) tool 512, a pre-processing tool 514, a third-party integration tool 516, and an optical character recognition (OCR) tool 518. In some implementations, the foreground augmentation software 500 can include more or fewer tools. In some implementations, some of the tools may be combined, some of the tools may be split into more tools, or a combination thereof.

The background image replacement tool 502 can be used to identify a BGRI to use for a user. The user may select the BGRI for a particular conference. For example, in the process of joining or at any time during the conference, the user may select the BGRI. In another example, the user may set a BGRI preference such that the BGRI set as a preference may be, by default, used when the user joins any conference. In yet another example, the employer of the employee may have pre-configured one or more BGRI preferences and the user can select one of these BGRIs. The BGRI can be a blurred background of the camera image. The BGRI can be a separate image from the camera image. The image can be a static or a moving image (e.g., a Graphics Interchange Format (GIF) image, a video).

The image segmentation tool 504 may obtain a segmentation of a camera image. Segmenting the camera image can include obtaining a foreground portion, a background portion, or both from the camera image. In an example, the image segmentation tool 504 may be or may use a machine learning model that is trained to identify a portrait (e.g., body definition, contour) of a user, who may be facing the camera. In an example, the image segmentation tool 504 may use a service (e.g., a cloud-based service) to obtain the segmentation. In an example, the foreground portion may be an image mask where the pixels of the portrait retain their values from the camera image and all other pixels are set to a certain color value (e.g., black, white) that facilitates image operations (e.g., adding images). In an example, the background portion may be an image mask where the pixels of the portrait are set to the certain value and all other pixels retain their values from the camera image. In an example, an image mask may be a binary image where the pixels of one portion are assigned a first value (e.g., one) and the pixels of the other portion are assigned a second value (e.g., zero).

The output image generation tool 506 obtains an output image that is to be displayed to the other participants. As further described herein, the output image generation tool 506 can obtain an RBGP from the BGRI based on the segmentation obtained by the image segmentation tool 504. In the case that the BGRI is a blurring of the actual background of the camera image, the output image generation tool 506 can obtain the RBGP by applying a blurring filter to the background portion obtained from the camera image. Any blurring filter can be used including, for example, one or more of a Gaussian blur filter, a lens blur filter, an average blur filter, a pixelizing filter, a linear motion blur filter, a circular motion blur filter, or any other blurring filter. The strength of the filter can be set such that the BGRI is not visible in the output image.

As further described herein, the output image generation tool 506 can augment the foreground portion with additional objects or portions of the user's physical environment as determined from an intent of the user (e.g., based on an indication received from the user). As mentioned above, the additional object or portion is a portion of the camera image that is not part of the foreground and is referred to as an "image portion." The output image generation tool 506 can be thought of as assembling the output image using the RBGP, the foreground portion, and the image portion. In an example, the output image generation tool 506 can identify the pixels constituting the image portion and replace the corresponding pixels of the BGRI with these pixels. As can be appreciated, image operations (e.g., scaling, up-sampling, down-sampling, or resizing) may need to be performed on one or more of the camera images, the BGRI, the foreground portion, the background portion, or the RBGP to obtain (e.g., build, construct, assemble) the output image.

FIGS. 6A-6F illustrate examples of output images presented on UIs of conferencing software, for example, the conferencing software 314 of FIG. 3, the conferencing software 406 of FIG. 4A or the conferencing software 456 of FIG. 4B. The UIs shown in FIGS. 6A-6F in particular illustrate a conference that includes three participants (represented by a participant 602A UI control, a participant 602B UI control, and a user 602C UI control). For brevity and ease of description, statements such "the participant 602A <verb>" should be understood to mean that the "participant represented by the participant 602A UI control <verb>." The user 602C has turned on his camera and, as such, output images of the user 602C are displayed on respective devices of the other participants. That is, the UI control representing the user is an output image of the user. The UIs of the conferencing software may include a main stage 604 and a participant list 606. The indication (e.g., a UI control, an icon, a label, an output image) of the participant currently speaking may be displayed in the main stage 604 and the non-speaking participants may be listed in the participant list 606.

Figures 6A, 6B:
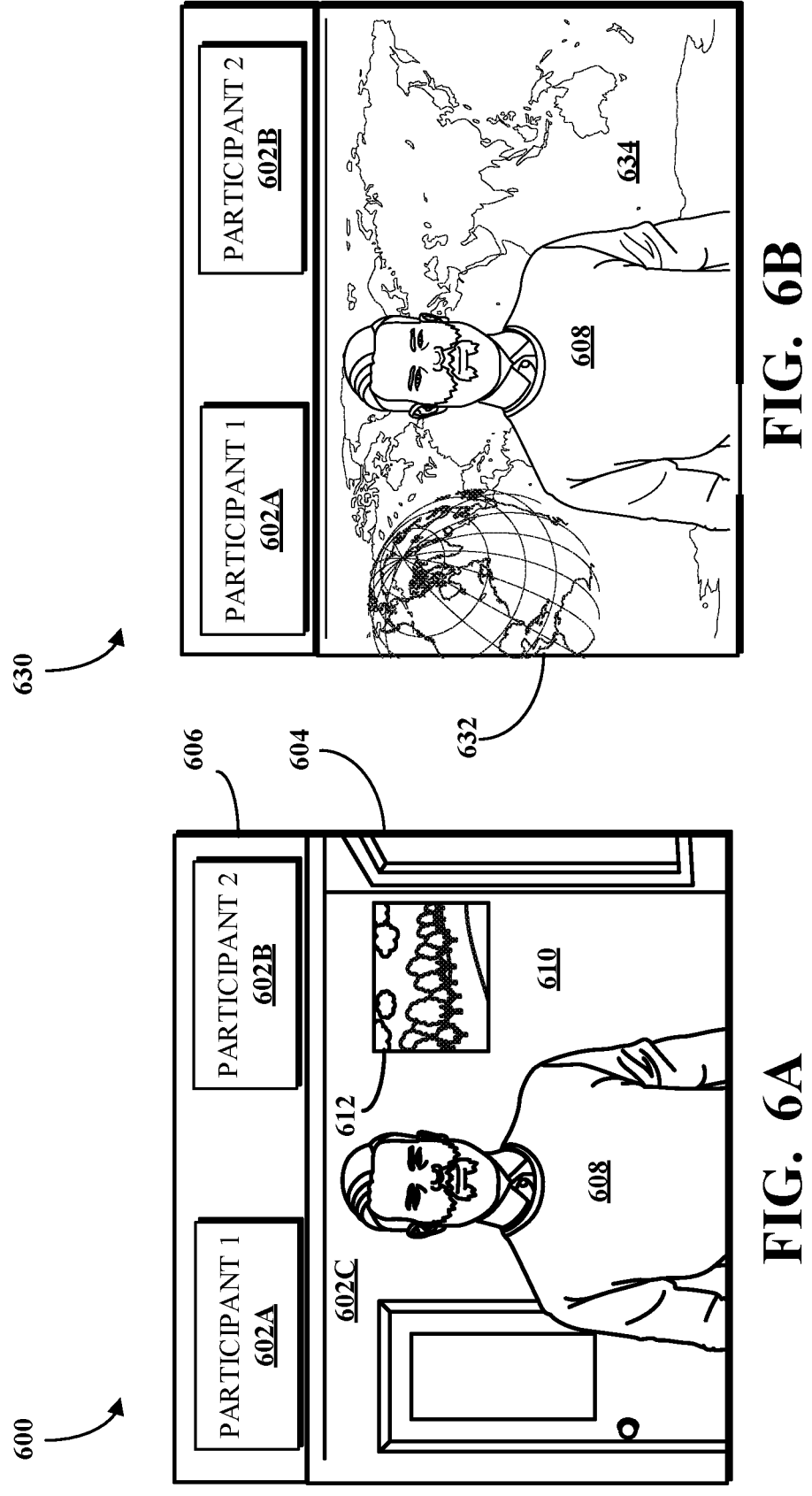
FIGS. 6A-6F illustrate examples of output images presented on user interfaces (UIs) of conferencing software.
Figures 6C, 6D:
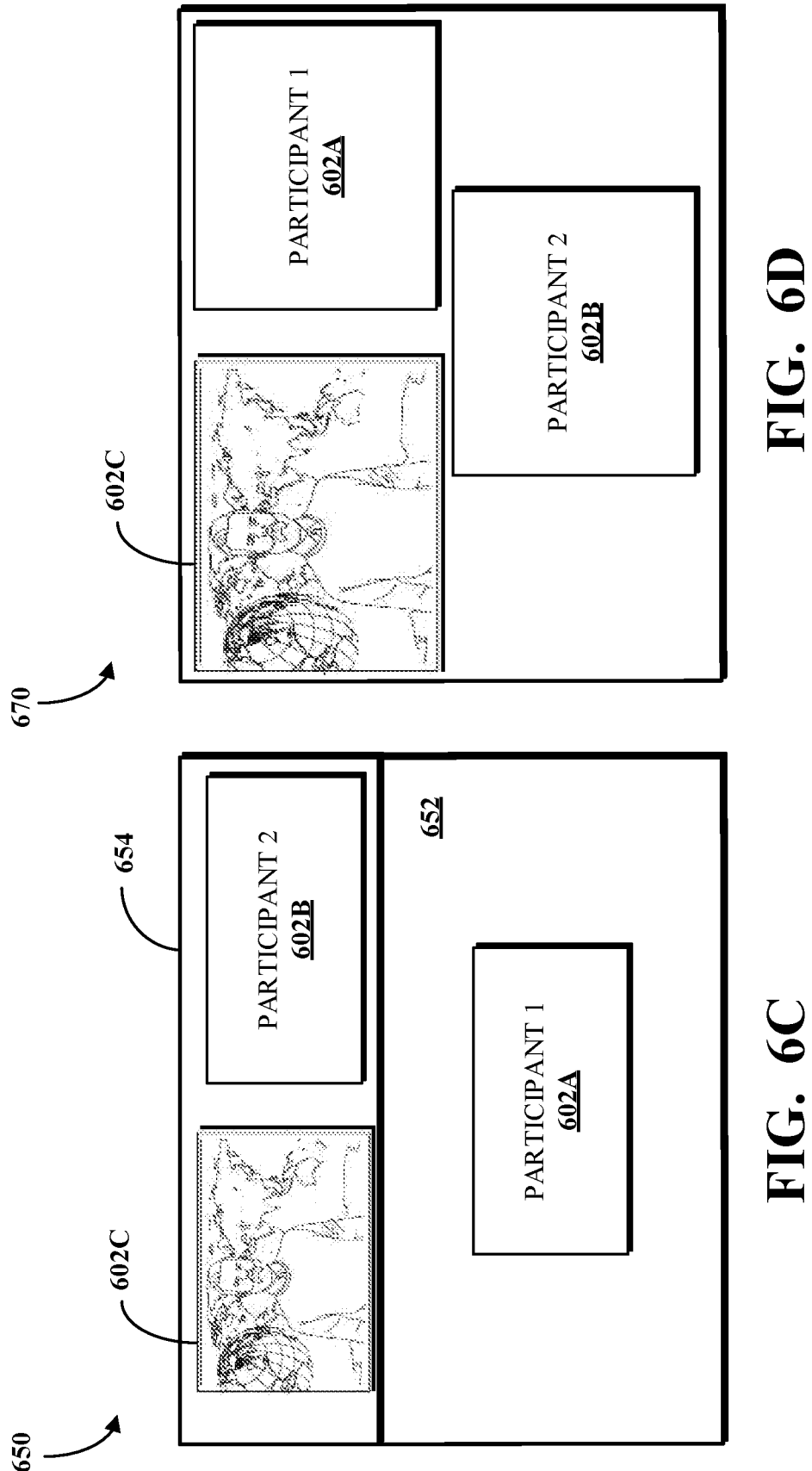
Figure 6E:
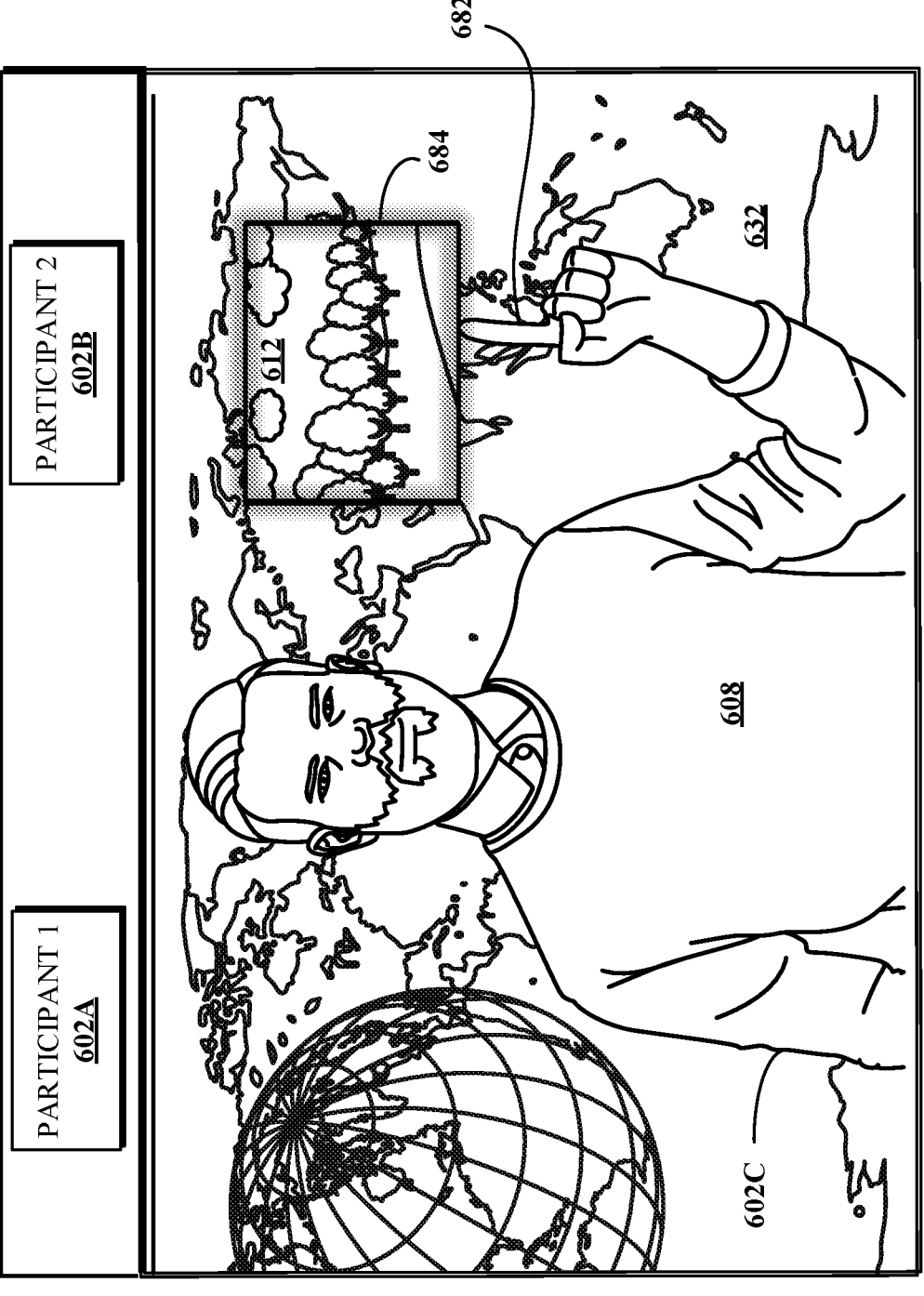
Figure 6F:
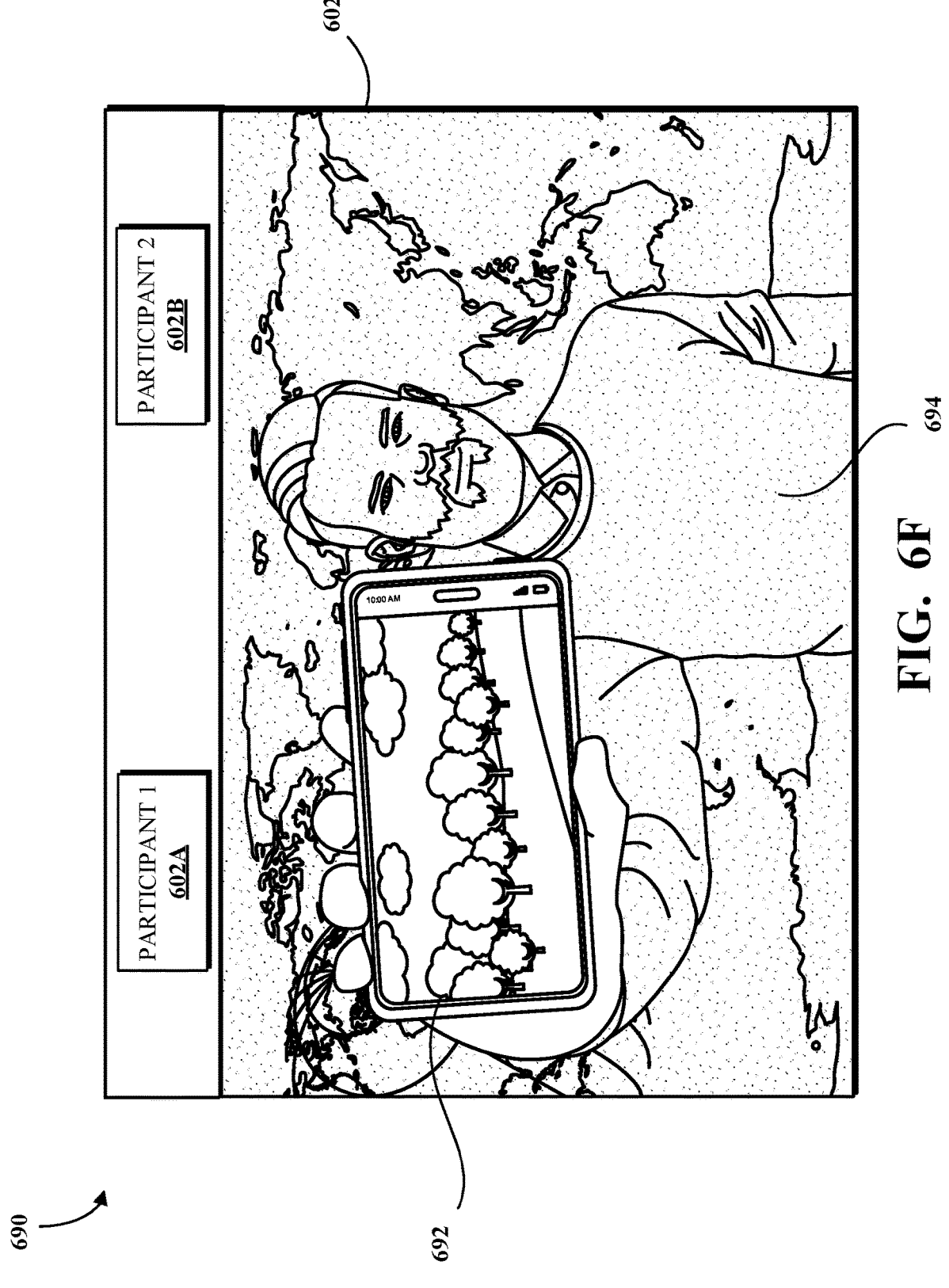

A UI 600 of FIG. 6A illustrates that the user 602C is currently speaking but has not selected a BGRI. As such, the main stage 604 shows the camera image of the user 602C. While the camera image of the user 602C is not segmented by the foreground augmentation software 500 of FIG. 5, a foreground portion 608 illustrates the portrait of the user 602C and a background portion 610 includes the rest of the camera image. The background portion 610 includes a picture 612 that is displayed on a wall behind the user 602C. A UI 630 of FIG. 6B illustrate that the user 602C has selected a BGRI, which may be recognized as a map of the world and a globe. The output image displayed in a main stage 632 now includes the foreground portion 608 and an RBGP 634. The output image generation tool 506 obtains the output image, as described above, by combining the foreground portion 608 with the RBGP 634. A UI 650 of FIG. 6C illustrates that the participant 602A is now speaking. As such, the participant 602A is now moved to a main stage 652 and the user 602C is moved to a participant list 654. A UI 670 of FIG. 6D illustrates an alternate arrangement of conference participants. In the UI 670, all participants are arranged in a grid-like pattern, regardless of who is speaking. FIGS. 6E-6F are described below.

Returning to FIG. 5, the gesture recognition tool 508 detects a gesture or a pose (collectively, a gesture) of the user. The gesture recognition tool 508 may be, use, or include a machine learning model that is trained to recognize user gestures. The gesture recognition tool 508 can use the gesture to identify an object in the camera image. The gestures recognized may include one or more of a pointing gesture or an object-holding gesture.

Detecting a gesture in a camera image can include detecting the gesture in a number of consecutive camera images. As can be appreciated, the camera may obtain images of the user at a certain frequency (e.g., 15, 24, or 30 frames-per-second). Thus, identifying a gesture in, for example, just one camera image may not actually be the user's intent as the gesture may have been identified based on a random movement of the user. Thus, detecting the gesture can mean identifying the gesture in a predetermined number of consecutive camera images (e.g., 30, 40, or consecutive images). The predetermined number of consecutive camera images may in at least some cases be a function of the frame rate. In an example, not every camera image may be processed to identity gestures. For example, every $n^{th}$ (e.g., $5^{th}$, $10^{th}$) camera image may be analyzed or ignored for the purposes of this analysis. As such, detecting the gesture can mean identifying the gesture in a predetermined number of consecutively analyzed camera images. In another example, for a gesture to be detected, the gesture must persist (i.e., be identified in consecutively analyzed images cameras) for a predetermined duration (e.g., 2 seconds, 3 seconds).

A UI 680 of FIG. 6E illustrates an example of a pointing gesture that is recognized by the gesture recognition tool 508. The gesture recognition tool 508 may use at least one of the camera image or the foreground portion to recognize gestures. The gesture recognition tool 508 identifies the object that the user is pointing to, as illustrated by a pointing gesture 682. In the UI 680, the user 602C is recognized to be pointing at or toward the picture 612 of FIG. 6A. As such, the gesture recognition tool 508 can cause the output image generation tool 506 to include the recognized object (i.e., the image portion) in the foreground portion. That is, the foreground portion is augmented with the recognized object so that the recognized object is visible in the output image. The output image generation tool 506 can be thought of as copying the pixels of the recognized object onto the output image. That is, the output image generation tool 506 can replace the corresponding pixels of the RBGP with the pixels of the image portion. In an example, the output image generation tool 506 can highlight the recognized object in the output image. The recognized object can be highlighted in any number of ways. For example, and as illustrated in the UI 680, a highlight 684 consisting of a glow around a bounding box can be used.

A UI 690 of FIG. 6F illustrates an example of an object-holding gesture that is recognized by the gesture recognition tool 508. The UI 690 illustrates that the user 602C is holding an object 692 (e.g., a portable device, this case) close to the camera to show the display of the portable device to the other participants. Object-holding, as used herein, includes object touching. For example, the user 602C may extend his right arm to touch another object (or person) that is to his right. The gesture recognition tool 508 identifies the touched object as an image portion to be displayed to the other participants as described with respect to FIG. 6E. As such, the output image generation tool 506 can generate the output image using a foreground portion (shot shown), an RBGP (not shown), and the object 692. As described below with respect to the pre-processing tool 514, the user 602C may provide an input that directs the pre-processing tool 514 to zoom in on the object 692 so that the user 602C doesn't need to hold the object 692 very close to the camera. To illustrate, the user 602C may say "hey conference, enlarge it."

In an example, in response to detecting the object-holding gesture and the object, the gesture recognition tool 508 may determine that the object is out of focus because the object is too far or too close to the camera. As such, the gesture recognition tool 508 can issue commands to the camera to focus the camera on the object. The commands can include one or more of exposure setting, focus setting, color setting, or other commands. In some situations, configuring the camera to focus on the image portion may result in at least some blurring to the foreground portion, as illustrated by the speckled pattern 694.

In an example, the object recognition tool 510 can be used to obtain a list of identified objects in a camera image. The object recognition tool 510 can be, use, or include a machine learning model for object detection that is trained to identify objects in images. Using the object recognition tool 510, a list of objects identified in the camera image may be presented to the user. The user can select one or more objects from the list. The selected one or more objects constitute the image portion. In an example, the list of objects may be textually presented to the user, such as in an alphabetical list. In an example, the list of objects may be additionally, or alternatively, presented graphically. For example, each object may be surrounded by a bounding box and associated with a label describing the object. The list of objects can be presented to the user in the conferencing software. In an example, the object recognition tool 510 enables the user to select the image portion, as described with respect to FIG. 7.

Figure 7:
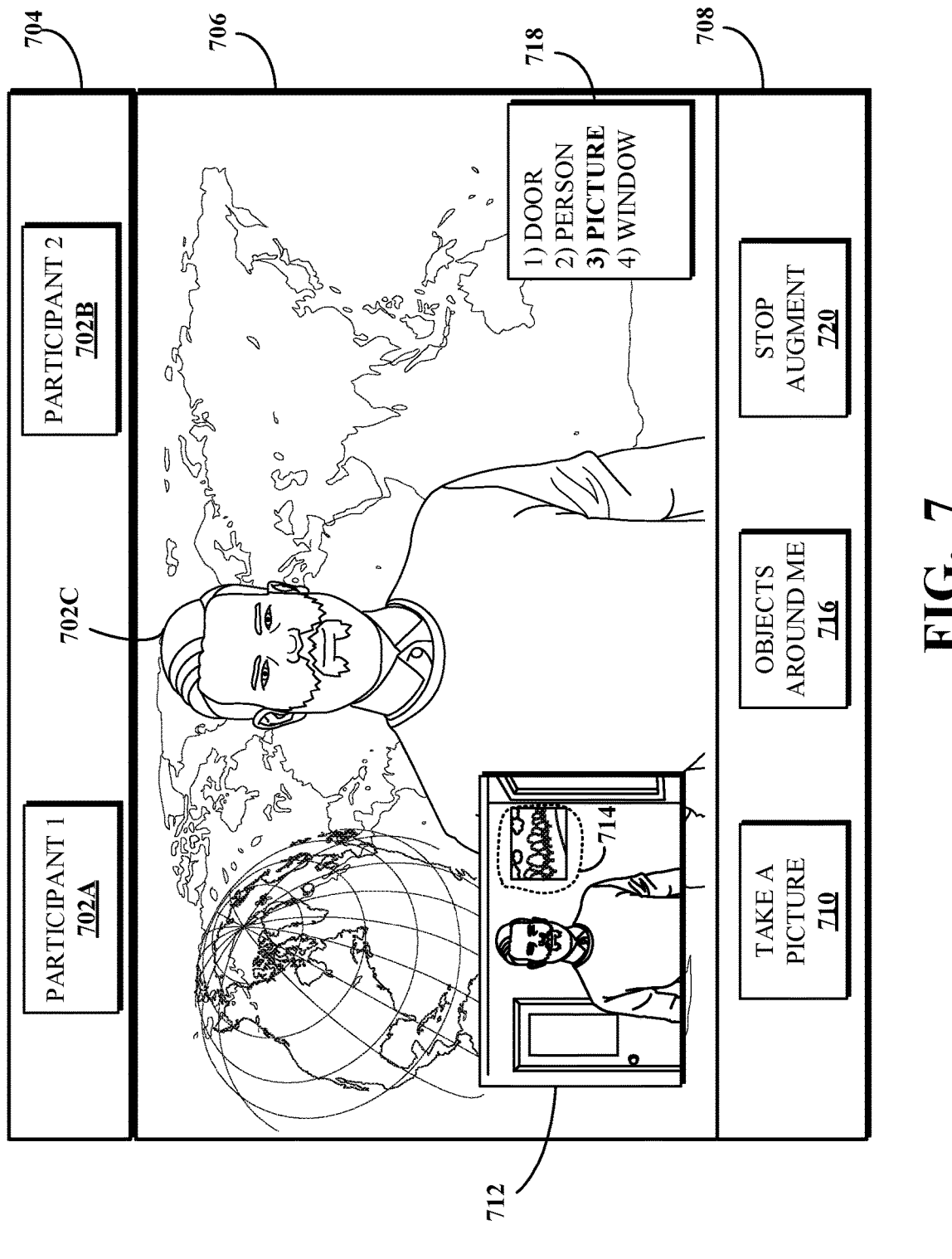
FIG. 7 illustrates an example of a UI for selecting image portions to augment a foreground portion of an output image.

FIG. 7 illustrates an example of a UI 700 for selecting image portions to augment a foreground portion of an output image. The UI 700 is a UI of a conferencing software. The UI 700 includes a participants list panel 704, a main stage 706, and a control panel 708. The control panel 708 includes controls that the user can use to select image portions to augment the foreground portion. The UI 700 illustrates that a current conference includes the participants 702A and 702B and the user 702C. The user 702C is using a BGRI, as described with respect to FIG. 6B.

In response to the user invoking a control 710, the foreground augmentation software 500 displays a camera image 712 to the user. The camera image may be obtained from the image stream received from the camera. The camera image 712 is displayed to the user but is not transmitted to the other participants. The user can use a pointing device (e.g., a mouse pointer, a stylus) to select an object in the image. As an example, the user may click (using the pointing device) on a location of the image (i.e., an image location). The object recognition tool 510 of FIG. 5 can identify an object of the image (i.e., the image portion) that includes the image location. The object recognition tool 510 receives the image location (e.g., a pixel location or a cartesian coordinate in the image) and identifies the object that contains the image location. As another example, the UI 700 illustrates that the user has drawn a free-form box 714 around a picture in the camera image (which is the picture 612 described with respect to FIG. 6A). In response to the user completing the free-form box 714, the gesture recognition tool 508 obtains, as an image portion, the object included in the free-form box 714. Using the selected object, an output image similar to those described with respect to FIGS. 6E-6F can be generated by the output image generation tool 506.

In response to the user invoking a control 716, the object recognition tool 510 obtains and causes to be presented a list 718 of detected objects. The list 718 illustrates that the objects DOOR, PERSON, PICTURE, and WINDOW were detected. In the UI 700, the list 718 of detected objects is presented textually. However, other arrangements are possible. For example, a camera image, such as the camera image 712 may be presented to the user and each detected object may be surrounded with a bounding box. In response to the user selecting one or more of the identified objects (such as from the list 718), an output image that includes the selected objects in the foreground portion can be obtained and transmitted for display to the other participants.

In response to the user invoking a control 720, the foreground augmentation software 500 stops augmenting the foreground portion with a current image portion. As such, the output image generation tool 506 returns to a state of obtaining output images similar to the output image described with respect to FIG. 6B. That is, the output image generation tool 506 generates output images using foreground portions and RBGPs without augmenting the foreground portions with additional image portions.

Returning to FIG. 5, the ASR tool 512 can be used to identify image portions using verbal commands of the user. The ASR tool 512 can match user utterances to objects identified in camera images. For example, the user may issue a command such as "hey conference, show the picture that's on my left." In response to the command, the gesture recognition tool 508 can obtain a list of objects as described above. The ASR tool 512 determines that the image portion is the "picture" and causes the output image generation tool 506 to obtain output images accordingly. In another example, the user may issue the command "hey conference, show what I am looking at." In response to the command, the object recognition tool 510 or another tool of the foreground augmentation software 500 may perform an analysis of the gaze of the user to identify the object or the general image portion that the user is looking at.

The pre-processing tool 514 can be used to pre-process the image portion before the processed image portion is added to the output image. For example, the pre-processing tool 514 can be used to apply a filter to the image portion before adding the image portion to the foreground portion. The pre-processing tool 514 can determine the filter to apply based on an analysis of the image portion. To illustrate, the image portion may include a reflective glass (e.g., as a picture frame, the screen of a handheld device). If the image portion is determined to include glare, then the pre-processing tool 514 can apply an anti-glare (e.g., a glare-reducing) filter to the image portion. For example, if the image portion is determined to be too dark, then the pre-processing tool 514 can apply a brightening filter. For example, if the image portion is determined to be blurry, then the pre-processing tool 514 can apply a sharpening filter. Additional filters are possible.

In another example, the pre-processing tool 514 may apply a special effect to the image portion to obtain a modified image portion. The modified image portion is added to the output image instead of the image portion. In an example, the pre-processing tool 514 may enlarge (e.g., zoom in) the image portion, such as in response to determining that the image portion is deep into the background of the camera image. For example, the image segmentation tool 504 may further segment the background portion into depth layers. As such different pixels of the background portion may be further assigned a depth value from a range of depth values (e.g., 0 to 4, where 4 indicates "very deep"). The enlargement factor used can be based on the depth value determined for the image portion. In another example, the pre-processing tool 514 may enlarge the object so that the user need not hold the object too close the camera. The pre-processing tool 514 may also reduce the size of (e.g., zoom out on) the image portion. The pre-processing tool 514 may apply the special effect in response to a user command. The user command can be a key combination, a verbal command, a gesture, or any other type of input that indicates to (e.g., directs) the pre-processing tool 514 to apply the special effect.

The third-party integration tool 516 can be used to pass (e.g., transfer) the image portion or another object obtained therefrom to another software, tool, application, server (collectively, software). The third-party integration tool 516 can use an Application Programming Interface (API) of the other software to pass the image portion or the derived object to the other software. In an example, the other software may be an image manipulation software. As such, the image portion itself may be passed to the other software.

The OCR tool 518 can be used to extract text from the image portion. The OCR tool 518 determines whether the image portion includes text and can extract the text from the image portion. The extracted text can be shared with all participants of the conference. For example, the OCR tool 518 can paste or cause to be pasted the extracted text into a chat session of the conference. In another example, the OCR tool 518 may determine that image portion includes a white/black board that the user is writing or drawing on and the OCR tool 518 can copy the extracted text and any drawing shapes from the image portion into a virtual whiteboard tool of the conference software.

Figure 8:
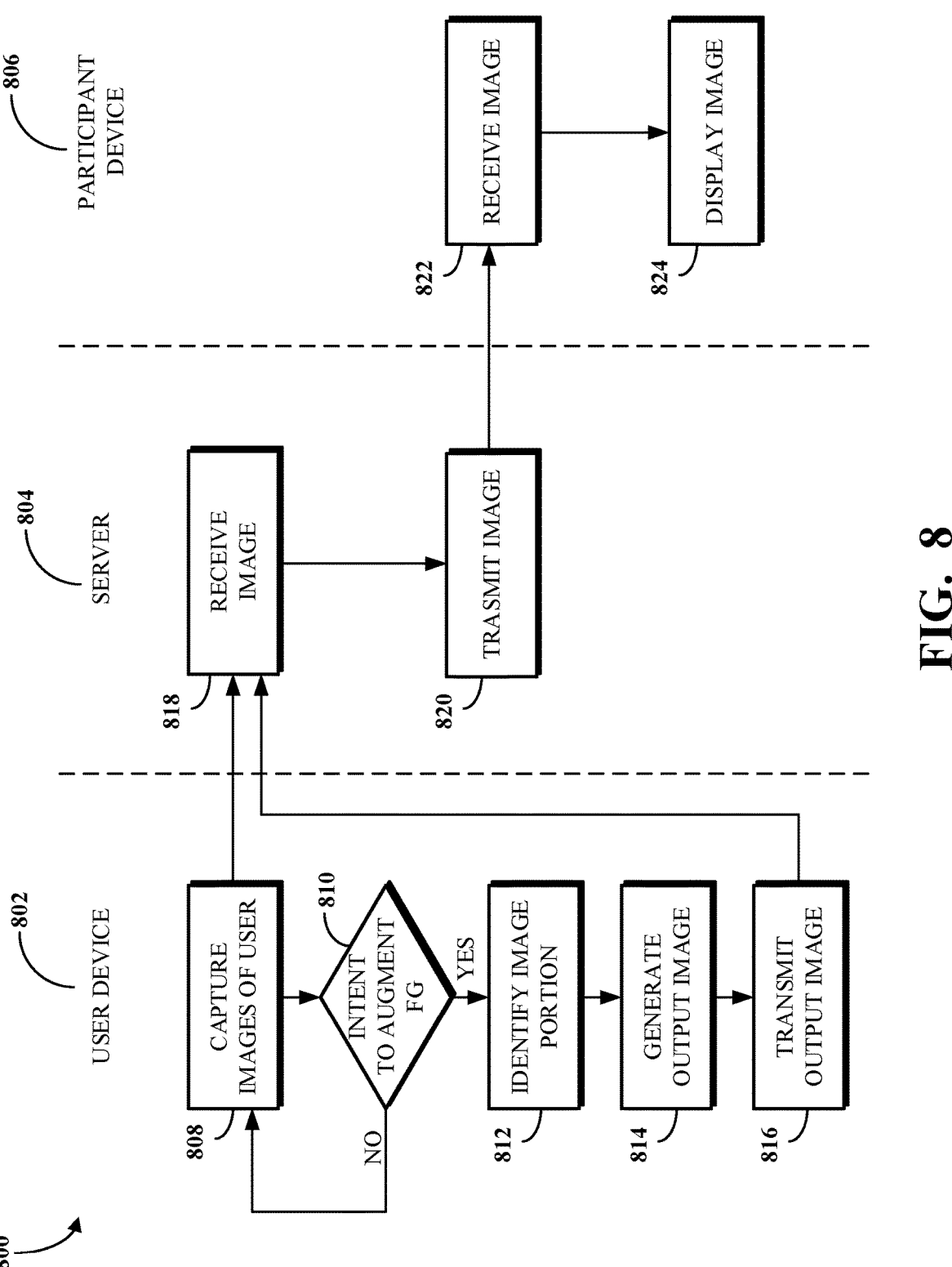
FIG. 8 is an example of an interaction diagram illustrating augmenting a foreground portion of an image of a conference participant.

FIG. 8 is an example of an interaction diagram 800 illustrating augmenting a foreground portion of an image (e.g., a camera image) of a conference participant. The interaction diagram 800 illustrates that two participants using respective participant devices, a user device 802 and a participant device 806, are current participants of a conference hosted by a server 804, which includes a conferencing software platform, such as the software platform 300 of FIG. 3, the software platform 402 of FIG. 4A, or the software platform 452 of FIG. 4B. The user device 802 can be the user device 470 of FIG. 4B. The participant device 806 can be the participant device 462 of FIG. 4B. As can be appreciated, the participant device 806 can be multiple participant devices. While not specifically shown in the interaction diagram 800, a conferencing software of the user device 802 is configured to use a BGRI. Additionally, the user device 802 includes a camera that obtains images for use by the conferencing software, as described herein.

At 808, camera images of the user of the user device 802 are captured and transmitted to the server 804. At 818, the server 804 receives the camera images and may receive camera images from other conference participants. At 820, the server may simply re-transmit each received camera image to the devices of the conference participants. In another example, the server 804 may assemble all the camera images received from the multiple participants into a single stream and transmits the single stream to the respective devices of the conference participants, including the participant device 806. At 824, a conferencing software of the participant device 806 causes the received image or combined image, as the case may be, to be displayed on a display of the participant device 806.

At 810, it is determined whether the user of the user device 802 intends to have the foreground portion of camera images augmented with an image portion of the physical environment of the user. The image portion can be or include one or more objects included in camera images, one or more areas of the camera images, or a combination thereof. If it is determined that the user intends to augment the foreground portion, then the interaction diagram 800 proceeds to 812; otherwise, the interaction diagram 800 proceeds back to 808.

The intent of the user can be identified based on a gesture of the user, as described with respect to gesture recognition tool 508 of FIG. 5. In an example, and as described above, the intent is determined in response to the gesture persisting for a predetermined number of analyzed images, a time duration, or a combination thereof. The intent of the user can be identified based on a command of the user. The command can be a verbal command as described with respect to the ASR tool 512 of FIG. 5. The command can be received from the user in response to the user performing a user-interface action, such as described with respect to FIG. 7. For example, the user may select one or more objects from a list of identified objects, as described with respect to the list 718 of FIG. 7. For example, the user may select an image area by drawing a bounding box around an image portion, such as described with respect to the free-form box 714 of FIG. 7. Other ways of identifying the user intent are possible.

At 812, the image portion of the camera image is identified based on the intent. At 814, an output image is generated. As described above, the output image can be generated by combining the foreground portion, the image portion, and an RBGP obtained from the BGRI such that the image portion is visible in the output image. While not specifically shown in the interaction diagram 800, generating the output image encompasses similarly generating subsequent output images until an indication is received, such as from the user, to stop augmenting the foreground portion. The indication to stop augmenting the foreground portion can be that the user uses a command of the conferencing software to stop obtaining camera images. Said another way, the indication can be that the user stops (e.g., turns off) the camera. In another example, the indication can be as described with respect the control 720 of FIG. 7. At 816, the output image is transmitted from the user device 802 to the server 804.

At 818, the server 804 receives the output image. The server 804 may receive output images from several participants of the conference. In some situations, at least one of the conference participants may not have enabled his/her camera. As such, no output images may be received from such participants. Rather, the server 804 may use respective representations for such users. To illustrate, in FIG. 6A, the participant 602A did not have his/her camera turned on. As such, the server 804 uses a box that includes the name (e.g., "PARTICIPANT 1"), the initial, or some other indicator of the user.

As mentioned above, at 820, the server 804 transmits the received images to the respective devices of the conference participants. In an example, the server 804 combines the output images into a single image and transmits the combined image to the participants. While not shown in the interaction diagram 800, the server 804 also transmits the combined image to the user device 802. At 822, the participant device 806 receives the image transmitted by the server 804. At 824, the received image is displayed on a display of the participant device 806.

To further describe some implementations in greater detail, reference is next made to examples of techniques which may be performed for augmenting a foreground portion of images of a conference participant. FIG. 9 is a flowchart of an example of a technique 900 for augmenting a foreground portion of images of a conference participant. The conference participant is assumed to have configured a conferencing software to use a BGRI, as described above. The technique 900 can be performed to replace a portion of the RBGP with an image portion of the physical environment of the conference participant.

The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof. In some implementations, the technique 900 can be performed, at least partially, by a user device, such as the user device 470 of FIG. 4B, or the user device 802 of FIG. 8. In some implementations, the technique 900 can be performed, at least partially, by a server, such as the server 400 of FIG. 4A. The technique 900 can be implemented by a foreground augmentation software, such as the foreground augmentation software 500 of FIG. 5.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, at least one of a foreground portion or a background portion are obtained from an image of a conference participant. The image of the conference participant can be a camera image, as described above. That is, the image of the conference participant can be obtained from a camera of a user device that includes a conferencing software that is in communication with the camera and via which the conference participant attends a conference. The image of the conference participant can be an image that is provided (e.g., uploaded) by the conference participant and may have been previously captured. In an example, a machine learning model, which receives the image as input, can be used to segment the image into at least one of the foreground portion or the background portion. In an example, the camera itself can include a segmentation algorithm. As such, the foreground portion and the background portion can be obtained from the camera. In an example, if one of the foreground or background portions is received, the technique 900 may obtain the other portion using any applicable image processing techniques.

At 904, an RBGP corresponding to the background portion is obtained using the background replacement image. As described above, image processing techniques, such as image masking, can be used to obtain the RBGP. At 906, an indication of an image portion that is included in the image and is outside (e.g., not included in) the foreground portion is obtained. The indication can be obtained from the conference participant. In an example, the indication can be a bounding box surrounding the image portion. In an example, obtaining the indication of the image portion can include identifying a gesture of the conference participant and identifying, in the image and based on the identified gesture, that the conference participant is pointing at the image portion.

At 908, an output image that includes the replacement background portion (RBGP), the foreground portion, and the image portion is generated. The output image is such that the foreground portion and the image portion are visible in the output image. The output image can be obtained by combining the foreground portion, the image portion, and the replacement background portion (RBGP). In an example, the replacement background portion (RBGP) is a blurring of the background portion of the camera image. As such, obtaining the output image can include unblurring the image portion. In an example, the technique 900 can include applying a filter to the image portion to obtain a filtered image portion. As such, obtaining the output image can include obtaining the output image by combining the background portion, the foreground portion, and the filtered image portion.

In some implementations, an intermediate image that combines the foreground portion and the RBGP may be obtained from the camera. As such, the technique 900 can add the image portion to the intermediate image. As described above, the technique 900 can identify an area of the intermediate image to substitute with the image portion. The technique 900 can then combine the intermediate image with the image portion, as described herein.

At 910, the output image is transmitted. When the technique 900 is implemented by a user device, the output image can be transmitted to a server, which in turn can transmit the output image to other participants, as described with respect to FIG. 8. In another example, such as in the case of a peer-to-peer communications, the output image can be transmitted directly to the device of another participant. When the technique 900 is implemented by a server, transmitting the output image can include combining the output image with respective output images of other participants and transmitting the combined image to the conference participants.

In an example, the technique 900 can include presenting a preceding image on a display of the conference participant, where the preceding image precedes the image in an image stream of the conference participant. The indication of the image portion can be obtained from the conference participant based on a markup of the preceding image by the conference participant. The manipulation of the preceding image can include, for example, drawing a bounding box on the preceding image. As such, the technique 900 can remember (e.g., store) the location and extent of the markup in the preceding image and apply the same to subsequent images to identify the image portion. In some examples, motion tracking can be used to identify that the image portion, or objects therein, are moving. As such the technique 900 can adjust at least the location of the image portion based on the motion tracking.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes obtaining a foreground portion and a background portion from an image of a conference participant. The method also includes obtaining, using a background replacement image, a replacement background portion corresponding to the background portion. The method also includes obtaining an indication of an image portion that is included in the image and is outside the foreground portion. The method also includes generating an output image that includes the replacement background portion, the foreground portion, and the image portion such that the foreground portion and the image portion are visible in the output image. The method also includes transmitting the output image. Other embodiments of this aspect include corresponding computer systems, apparatus, and computer programs recorded on one or more computer storage devices, each configured to perform the actions of the methods.

Implementations may include one or more of the following features. The method where obtaining the indication of the image portion may include receiving, from the conference participant, a bounding box surrounding the image portion. Obtaining the indication of the image portion may include identifying a gesture of the conference participant; and identifying the image portion based on the identified gesture. The indication of the image portion may be obtained verbally from the conference participant. The image portion may be identified based on a pixel location received from a pointing device. The indication of the background replacement image may be an indication to blur the background portion, and generating the output image may include unblurring the image portion based on the indication of the image portion. The preceding image may precede the image in an image stream of the conference participant, and obtaining, from the conference participant, the indication of the image portion may include obtaining the indication based on a markup of the preceding image by the conference participant. Obtaining the indication of the image portion may include obtaining the indication from a preceding image of the conference participant, where the preceding image may precede the image in an image stream of the conference participant. Obtaining the indication of the image portion may include determining that the indication is identified in a predetermined number of images of the conference participant. Obtaining the indication of the image portion may include determining that the indication persists in images of the conference participant for a predetermined duration of time. Obtain the indication of the image portion may include obtaining, using a machine learning model for object detection, a list of objects from the image of the conference participant; obtaining, from the conference participant, a selection of at least one object of the list of objects; and identifying the image portion based on the at least one object.

The method may also include receiving a request from the conference participant to stop displaying the image portion. Responsive to the request, subsequent output images may be generated from respective subsequent images of the conference participant, where each subsequent output image may include of a foreground portion obtained from a corresponding subsequent image and the replacement background portion. Obtaining the indication of the image portion may include identifying, in the image captured by a camera, a gesture of the conference participant. The conference participant may be determined to be holding an object. The camera may be configured to focus on the object.

The method may also include performing optical character processing on the image portion to extract text included in the image portion. The text may be transmitted to participants of the conference. Generating the output image may include applying a special effect to the image portion to obtain a modified image portion. The output image may be generated by combining the replacement background portion, the foreground portion, and the modified image portion. The output image may further include a highlight of the image portion. Generating the output image may include applying an anti-glare filter to the image portion to obtain a filtered image portion. The output image may be generated by combining the replacement background portion, the foreground portion, and the filtered image portion. Generating the output image may include generating the output image by combining the background portion, the foreground portion, and the filtered image portion. Implementations of the described techniques may include hardware, a method or process, or computer software on a computer-accessible medium.

One general aspect includes a device. The device also includes a memory. The device also includes a processor. The processor may be configured to execute instructions stored in the memory to obtain a foreground portion and a background portion from an image of a conference participant. A replacement background portion may be obtained using a background replacement image corresponding to the background portion. An indication of an image portion that is included in the image and is outside the foreground portion may be obtained. An output image that includes the replacement background portion, the foreground portion, and the image portion is obtained such that the foreground portion and the image portion are visible in the output image; and transmit the output image. Other embodiments of this aspect include corresponding computer systems, apparatus, and computer programs recorded on one or more computer storage devices, each configured to perform the actions of the methods.

One general aspect includes a non-transitory computer readable medium that stores instructions operable to cause one or more processors to perform operations. The operations may include obtaining a foreground portion and a background portion from an image of a conference participant. The operations may also include obtaining, using a background replacement image, a replacement background portion corresponding to the background portion. The operations may also include obtaining an indication of an image portion that is included in the image and is outside the foreground portion. The operations may also include generating an output image that includes the replacement background portion, the foreground portion, and the image portion such that the foreground portion and the image portion are visible in the output image. The operations may also include transmitting the output image. Other embodiments of this aspect include corresponding computer systems, apparatus, and computer programs recorded on one or more computer storage devices, each configured to perform the actions of the methods.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A method, comprising:
obtaining a foreground portion and a background portion from an image of a conference participant;

obtaining, using a background replacement image, a replacement background portion corresponding to the background portion;
obtaining, based on a gesture of the conference participant during a conference, an indication of an image portion that is included in the image and is outside the foreground portion, wherein obtaining the indication of the image portion comprises:
determining that the gesture persists in images of the conference participant for a predetermined duration of time;
generating an output image that includes the replacement background portion, the foreground portion, and the image portion such that the foreground portion and the image portion are visible in the output image; and
transmitting the output image.
2. The method of claim 1, further comprising:
receiving, from the conference participant, a bounding box surrounding another image portion; and
generating another output image that includes the replacement background portion, the foreground portion, and the another image portion such that the foreground portion and the another image portion are visible in the output image.
3. The method of claim 1, further comprising:
obtaining an indication of another image portion verbally from the conference participant; and
generating another output image that includes the replacement background portion, the foreground portion, and the another image portion such that the foreground portion and the another image portion are visible in the output image.
4. The method of claim 1, further comprising:
obtaining an indication of another image portion based on a pixel location received from a pointing device; and
generating another output image that includes the replacement background portion, the foreground portion, and the another image portion such that the foreground portion and the another image portion are visible in the another output image.
5. The method of claim 1, further comprising:
receiving an indication of the background replacement image to blur the background portion,
wherein generating the output image comprises:
unblurring the image portion based on the indication of the image portion.
6. The method of claim 1, further comprising:
presenting a preceding image on a display of the conference participant, wherein the preceding image precedes the image in an image stream of the conference participant; and
obtaining another indication of another object based on a markup of the preceding image by the conference participant.
7. The method of claim 1, further comprising:
applying a filter to the image portion to obtain a filtered image portion, wherein generating the output image comprises:
generating the output image by combining the background portion, the foreground portion, and the filtered image portion.
8. A device, comprising:
a memory; and
a processor, the processor configured to execute instructions stored in the memory to:
obtain a foreground portion and a background portion from an image of a conference participant;

obtain, using a background replacement image, a replacement background portion corresponding to the background portion;

obtain, based on a gesture of the conference participant during a conference, an indication of an image portion that is included in the image and is outside the foreground portion, wherein to obtain the indication of the image portion comprises to:

determine that the gesture persists in images of the conference participant for a predetermined duration of time;

generate an output image that includes the replacement background portion, the foreground portion, and the image portion such that the foreground portion and the image portion are visible in the output image; and transmit the output image.

9. The device of claim 8, wherein to obtain the indication of the image portion, the processor is configured to execute the instructions to:

obtain the indication from a preceding image of the conference participant, wherein the preceding image precedes the image in an image stream of the conference participant.

10. The device of claim 8, wherein the processor is further configured to execute instructions to:

obtain another indication of another image portion by determining that the another indication is identified in a predetermined number of images of the conference participant.

11. The device of claim 8, wherein the processor is configured to execute the instructions to:

obtain, using a machine learning model for object detection, a list of objects from the image of the conference participant;

obtain, from the conference participant, a selection of at least one object of the list of objects; and identify another image portion based on the at least one object.

12. The device of claim 8, wherein the processor is further configured to execute the instructions to:

receive a request from the conference participant to stop displaying the image portion; and responsive to the request, generate subsequent output images from respective subsequent images of the conference participant, wherein each subsequent output image consists of a foreground portion obtained from a corresponding subsequent image and the replacement background portion.

13. The device of claim 8, wherein the processor is configured to execute the instructions to:

identify, in another image captured by a camera, another gesture of the conference participant;

determine that the conference participant is holding an object based on the another gesture; and configure the camera to focus on the object.

14. The device of claim 8, wherein the processor is further configured to execute the instructions to:

perform optical character processing on the image portion to extract text included in the image portion; and transmit the text to participants of the conference.

15. The device of claim 8, wherein to generate the output image, the processor is configured to execute the instructions to:

apply a special effect to the image portion to obtain a modified image portion; and generate the output image by combining the replacement background portion, the foreground portion, and the modified image portion.

16. The device of claim 8, wherein to generate the output image, the processor is configured to execute the instructions to:

apply an anti-glare filter to the image portion to obtain a filtered image portion; and generate the output image by combining the replacement background portion, the foreground portion, and the filtered image portion.

17. A non-transitory computer readable medium that stores instructions operable to cause one or more processors to perform operations including:

obtaining a foreground portion and a background portion from an image of a conference participant;

obtaining, using a background replacement image, a replacement background portion corresponding to the background portion;

obtaining, based on a gesture of the conference participant during a conference, an indication of an image portion that is included in the image and is outside the foreground portion, wherein obtaining the indication of the image portion comprises:

determining that the gesture persists in images of the conference participant for a predetermined duration of time;

generating an output image that includes the replacement background portion, the foreground portion, and the image portion such that the foreground portion and the image portion are visible in the output image; and transmitting the output image.

18. The non-transitory computer readable medium of claim 17, wherein the output image further comprises a highlight of the image portion.

19. The method of claim 1, further comprising:

determining that the conference participant is holding an object; and configuring a camera that captured the image of the conference participant to focus on the object.

20. The non-transitory computer readable medium of claim 17, wherein the operations further comprise:

configuring a camera to focus on an object in response to determining that the conference participant is holding the object.

\* \* \* \* \*